United States Patent

[11] 3,607,815

[72] Inventor Tad L. Patton
 Baytown, Tex.
[21] Appl. No. 730,915
[22] Filed May 21, 1968
[45] Patented Sept. 21, 1971
[73] Assignee Esso Research and Engineering Company

[54] DYEABLE POLYOLEFIN FIBER
 12 Claims, No Drawings
[52] U.S. Cl. .................................................. 260/30.6,
 260/31.2, 260/31.8, 260/88.3, 260/895, 260/897, 264/78
[51] Int. Cl. ...................................................... C08f 45/22, C08f 45/50
[50] Field of Search ........................................... 260/30.6, 895, 897, 31.890, 41, 31.2 N, 88.3; 264/78

[56] References Cited
 UNITED STATES PATENTS
| | | | |
|---|---|---|---|
| 2,980,964 | 4/1961 | Dilke ............................ | 260/30.6 X |
| 3,115,478 | 12/1963 | Giustiniani ................... | 260/45.5 |
| 3,153,680 | 10/1964 | Giustiniani ................... | 260/874 |
| 3,308,086 | 3/1967 | Wartman ...................... | 260/30.6 |

OTHER REFERENCES
Plasticization and Plasticizer Processes, " Glass Transition Temperatures of Polymers, Shen et al. 1965 pp. 27– 28

Primary Examiner—Morris Liebman
Assistant Examiner—Richard Zaitlen
Attorneys—Thomas B. McCulloch, Melvin F. Fincke, John S. Schneider, Sylvester W. Brock, Jr., Kurt S. Myers and Timothy L. Burgess ABSTRACT: Disclosed is an improvement in the drawing of fiber from a polyolefin blend containing up to about 10 percent by weight of a dye receptor additive wherein the drawing utilizes a drawbar heated from about 65° C. to about 140° C. The improvement comprises employing as a dye receptor additive a polymer of a vinyl pyridine base plasticized with a minor amount of plasticizer to have a glass transition temperature equal or lower than the temperature to which the drawbar is heated, whereby the vinyl pyridine polymer substantially elongates with the polyolefin during drawing. A dyeable composition consists of a polymer of a vinyl pyridine base mixed with a minor portion of a plasticizer. A dyeable fiber is prepared from a blend of a fiber-forming polyolefin with up to about 10 percent, based on weight of the blend, of a polyvinylpyridine plasticized with a sufficient amount of plasticizer to reduce the glass transition temperature of the polyvinylpyridine to a level equal or lower than the temperature at which the drawbar is heated in the drawing of the fiber.

DYEABLE POLYOLEFIN FIBER

BACKGROUND OF THE INVENTION

1. Field of the Invention

This invention is directed to new dyeable compositions of matter and a method of employing the same with polyolefin resin to form fiber. More particularly, it relates to a method of drawing melt spun polyolefin resin containing polyvinylpyridines as dye receptors that takes into account the glass transition temperature of polyvinylpyridines and utilizes plasticizers to reduce such temperature relative to drawing temperatures to effect better availability of dye receptors to dyes.

2. Description of the Prior Art

Synthetic polyolefins, such as polypropylene, lack polar groups to which dye molecules can become attached. It is well known that such hydrocarbon resins may be made dyeable by blending dye-receptive polymers of various vinyl substituted mono- and polycyclic pyridine bases into them to serve as dyesites. Such blends may be formed into dyeable fiber by the melt spinning technique, in which fiber is formed by extruding a melt of the resin through a multiholed die or spinneret, with a subsequent mechanical drawing of the fiber under suitable thermal conditions. The spun and drawn fiber, an article of commerce, may be then dyed in subsequent processing, usually after having been knitted or otherwise incorporated into fabric, carpet, etc.

The drawing of the fiber is a singularly critical step in the manufacture of fiber, for the drawing imparts orientation to the fiber matrix, effecting the physical properties of the fiber. In the drawing operation, the extruded fiber, after drawdown, quenching, and drying, is wound onto a pullout roll at a first Godet station and then, or at later time, passed over a heated "drawbar" or other heat-imparting means to a second Godet station driven by high speed motors, the ratio of the speed of the second Godet draw roll to the speed of the first Godet pull roll being called the draw ratio. The higher the draw ratio, the more orientation is imparted to the fiber. A common draw ratio is about 4:1.

Because the utilization of dyesite additives to impart dyeability to such fiber involves greater cost per unit in the manufacture of fiber, it is highly desirable that a minimum amount of each additives be used to achieve particular dye qualities. It is therefore quite important that a maximum number of the polymer additive dyesites in the polyolefin be available for reaction with dye molecules during the dyeing process.

A maximum availability of dye sites in polyolefin fibers would appear to depend upon the dye-receptive polymers being well and uniformly dispersed throughout the polyolefin. In addition, it would be expected that a maximum number of polar pyridine ring dyesites would be available for reaction with dyes if, during the drawing process, the dispersed particles of dye receptor polymer were extended in linear disposition with the polyolefin matrix. Present day dyesite-additive technology has not provided these efficiencies.

Microscopic examination of dyed fibers conventionally spun and drawn from polyolefin blends containing dye-receptive polymers of vinyl pyridine bases reveals that the color bearing dyesites of such fibers are discrete globules or nodules irregularly disposed in the fiber. In addition, vacuous polar areas may be seen at the ends of the nodules longitudinal of the fiber, indicating that when the fibers were drawn, the polyolefin resin pulled and separated from comparatively inductile dye receptor polymers, leaving the undrawn polymeric dyesites relatively convoluted and interfolded so that many of the individual pyridine ring dye receptors were sequestered and screen from reaction with approaching dyes.

Summary of the Invention

The present invention involves the recognition of the problem of secluded dye receptors of polymeric vinyl pyridine dyesites in polyolefins and discloses a method and compositions for increasing their exposure. Briefly summarized, fibers of improved dyeability are provided with an improvement in the method of drawing melt spun fibers from a polyolefin blend containing up to about 10 percent of a dye receptor polyvinylpyridine, where the drawing is conducted at a drawbar or equivalent heater temperature of from 65° C. to about 140° C. In the improved method there is used as a dye receptor in the polyolefin a polyvinylpyridine plasticized with an amount of plasticizer sufficient to cause the polyvinylpyridine to have a glass transition temperature no higher than the temperature to which the aforesaid drawbar is heated so that the polyvinylpyridine substantially elongates with the polyolefin during drawing.

Aspects of the invention involve a new composition of matter provided by the blend of a plasticizer and a polymer of a vinyl pyridine base. There is also provided a dyeable fiber comprised of a fiber-forming polyolefin blended with up to about 10 weight percent, based on the weight of the blend, of a vinyl pyridine polymer plasticized with an amount of plasticizer effective to lower the glass transition temperature of the vinyl pyridine polymer to a level no higher than a temperature of a drawbar heated within a range of from about 65° C. to about 140° C.

The nature of the invention may be better understood in reference to the problem it recognizes and solves. Ordinarily, in the drawing of melt spun polyolefin fiber, the fiber is pulled under constant tension over a drawbar heated from about 65° C. to about 140° C. at speeds of from 300 to about 1200 feet per minute. The drawbar is about a foot or so in length. In the fraction of a second that an increment of fiber passes over the drawbar, the fiber must be heated to a level substantially near or above its glass transition temperature (Tg), the temperature at which the polymer changes from a glassy or brittle condition to a rubbery condition. This is necessary in order that the fiber can be drawn sufficiently to effectively orient the fiber matrix without causing strand breakage.

Linear high polymers of alpha-monoolefins like polypropylene, which have relatively low glass transition temperatures, can easily attain the rubbery condition in the aforesaid operation. For example, polypropylene in the molecular weight herein discussed has a glass transition temperature of about −18°C. But polyvinylpyridines that have flow properties which permit their use in fibers (polyvinylpyridines in the molecular weight range of 12,000–15,000) have glass transition temperatures on the order of, in the case of poly (2-vinylpyridine), about 90° C., and in the case of poly(2-vinylpyridine), about 90° C., and in the case of poly(2-methyl-5-vinylpyridine), about 90° C., and in the case of poly(2-methyl-5-vinylpyridine), about 125° C. A 50:50 copolymer of 2-vinylpyridine and 2-methyl-5-vinylpyridine has a glass transition temperature about half way between 90° C. and 125° C. When polyolefin fibers containing blends of such polyvinylpyridines are passed over drawbars operating at temperatures even equivalent to the glass transition temperatures of such polyvinylpyridines, the polyvinylpyridine dyesites are not oriented and elongated in concert with the polyolefinic matrix, because in the fraction of a second that the segment of the fiber to be heated passes over the drawbar, the temperature of the fiber does not attain the temperature of the drawbar. Indeed, it is believed that the temperature of the fiber comes within only about 10°–50° of the temperature of the drawbar, depending on the conditions employed, the nature of the particular apparatus, etc. This problem is further compounded by the fact that drawbars are usually operated in the middle portions of the indicated range, that is, at temperatures of about 80°–90° C., a temperature lower than the glass transition temperature of most polyvinylpyridines.

What the present invention does is lower the glass transition temperature of polyvinylpyridines operating under these conditions to allow them to extend and orient with polyolefins during drawing so that more polar pyridine rings per dye receptor polymer are made available in drawn fibers for reaction with neutral, premetallized, acid, disperse and other reactive dyes.

Description of the Preferred Embodiments

A more complete understanding of the present invention and a fuller appreciation of the advantages thereof may be gained from the following description of preferred modes, in which the following terms are used as indicated.

The term "polyolefin" is employed to include alpha-monoolefin polymers produced by the well-known high pressure, low pressure, or Ziegler-type polymerization processes. While further discussion is mainly in terms of the representative (and preferred) polyolefin, polypropylene, the term "-polyolefin" equally applies to all linear high polymers of alpha-monoolefins which can be formed into fibers, such as polypropylene, poly-1-butene and poly(4-methyl-1-pentene). As used in connection with polyolefins, the term "polymer" refers to homopolymers of alpha-monoolefins, copolymers of one such alpha-monoolefin with another such alpha-monoolefin, or with a polymerizable olefinic monomer such as styrene, or the like, such polymers having molecular weights in the general range of about 150,000 to 500,000.

The term "vinyl pyridine base" refers to vinyl substituted mono- and polycyclic pyridine bases, such as the vinyl pyridines and vinyl quinolines. Examples of such vinyl pyridine bases are 2-vinylpyridine, 3-vinylpyridine, 4-vinylpyridine, 5-ethy-2-vinylpyridine, 2-methy-5-vinylpyridine, 2-methyl-6-vinylpyridine, 2, 4-dimethyl-6-vinylpyridine, 5-propyl-2-vinylpyridine, 2-vinylquinoline, and 4-vinylquinoline. The references that have been made to vinyl pyridine base "polymers," sometimes called "polyvinylpyridines," include homopolymers polymerized from monomers from one such vinyl pyridine base and copolymers polymerized from one such base with another such base, or with polymerizable monomers such as styrene.

While aspects of the present invention are applicable to all shaped articles of polyolefins such as fibers, foils, films, rods, strands, and the like, for simplicity of description the same will be described as it is applicable to fibers, it being understood that this is merely intended in an illustrative sense and that the invention should not be limited thereby. The reference to fiber is of wide application and includes monofilament, multifilament, textured or plain, stable, tow, or stock fiber.

In accordance with the present invention there is provided a dyeable composition of matter comprised of a blend of plasticizer and a polymer of vinyl pyridine base. The prime qualities of the plasticizer are solubility in polyvinylpyridine and an essential insolubility in water, generally less than 1.0 percent by weight, an absence of halogen atoms which in the presence of nitrogen- containing pyridine rings would likely dehydrohalogenate to degrade the fiber, and essential nonvolatile behavior at melt spinning temperatures of from 450°–600° F. The plasticizer must be capable of lowering the melt viscosity and glass transition temperature of the polyvinylpyridine in which it is dissolved.

Examples of the "plasticizers" which may be blended with polymers of vinyl pyridine base monomers are esters derived from:

1. saturated and unsaturated aliphatic and aromatic mono- and di-carboxylic acids, both substituted and unsubstituted,
2. phosphoric acid,
3. sulfonic acid, and
4. alcohols. Other suitable plasticizers qualified by the above-indicated requirements are certain ethers, petroleum derivatives, and epoxy resins.

Suitable esters may thus derive from acids of, for example, isobutyric, caprylic, pelargonic, palmitic, stearic, abietic, oleic, benzoic, succinic, adipic, azelaic, sebacic, fumaric, maleic, tartaric, isophthalic, phthalic, mellitic, phosphoric, and sulfonic acids. Suitable alcohols are, for example, derivatives of glycerol and glycol.

Thus, suitable plasticizers are 2,2,4-trimethyl- 1,3-pentanediol diisobutyrate, butanediol dicaprylate, triethylene glycol dipelargonate, n-butyl palmitate, isooctyl palmitate, n-butyl stearate, ethylene glycol monoethyl ether stearate, ethylene glycol mono-butyl ether stearate, hydroabietyl alcohol, methyl abietate, hydrogenated methyl avietate, butyl oleate, amyl oleate, octyl fatty acid esters, ethylene glycol monoethyl ether oleate, ethylene glycol monobutyl ether oleate, tetra-hydrofurfuryl oleate, 2-ethylhexyl-p-oxybenzoate, diethylene glycol dibenzoate, dipropylene glycol dibenzoate, ethylene glycol dibenzoate, triethylene glycol dibenzoate, polyethylene glycol (200) dibenzoate, polyethylene glycol (600) dibenzoate, benzophenone, diethyl adipate, di-n-hexyl adipate, dicapryl adipate, di-(2-ethylhexyl adipate, di-isooctyl adipate, dinonyl adipate, octyl decyl adipate, di-decyl adipate, dibutoxy-ethyl adipate, dibutoxyethoxy ethyl adipate, di(methyl-cyclohexyl) adipate, ditetraethylfurfuryl adipate, benzyloctyl adipate, dibutyl succinate, di-2-ethylhexyl azelate, di-n-hexyl azelate, di-isooctyl azelate, di-2-ethylhexyl-4-thioazelate, diethyl sebacate, dibutyl sebacate, dioctyl sebacate, di-isooctyl sebacate, dibutoxyethyl sebacate, dibenzyl sebacate, dibutyl fumarate, diisooctyl fumarate, di-n-butyl maleate, dibutyl tartrate, di(2-ethylhexyl) isophthalate, dimethyl phthalate, diethyl phthalate, dibutyl phthalate, diisobutyl phthalate, diamyl phthalate, dihexyl phthalate butyl octyl phthalate, butyl isodecyl phthalate, butyl iso-hexyl phthalate, di octyl phthalate, di-n-octyl phthalate, dioctyl isophthalate, di-n-octyl phthalate, dioctyl isophthalate, dicapryl phthalate, di-(2-ethyl-hexyl) phthalate, dinonyl phthalate, n-octyl-n-decyl phthalate, octyl decyl phthalate, di-decyl phthalate, ditridecyl phthalate, diltridecyl phthalate, ethylhexyl-decyl phthalate, butyl -ethylhexyl phthalate, butyl benzyl phthalate, dicyclohexyl phthalate, di(methyl-cyclohexyl) phthalate, diphenyl phthalate, di(ethoxy-ethoxyethyl) phthalate, dibutoxy ethyl phthalate, bis-(diethylene glycol monoethyl ether) phthalate, acetyl tri-(2-ethylhexyl) citrate, n-octyl, n-decyl trimellitate.

Polyhydric alcohols whose derivatives may be employed as plasticizers are glycerol tributyrate, triethylene glycol di-caprylate-caprate, triethylene glycol di-(2-ethylhexoate), triethylene glycol dicaprylate, polyethylene glycol di-(2-ethylhexoate), and butyl phthalyl butyl glycolate.

Esters of phosphoric acid which may be used as plasticizers include tri-(2-ethylhexyl) phosphate, tributoxyethyl phosphate, triphenyl phosphate, cresyl diphenyl phosphate, tricresyl phosphate, tri-dimethyl-phenyl phosphate, diphenylxylenyl phosphate, and alkyl aryl phosphate. Esters of various of the phosphate acids and phthalic acids have been found to work well in reducing the glass transition temperature of polyvinylpyridines and are preferred.

These specified examples of plasticizers are by no means exhaustive of the plasticizers that meet the indicated requirements for candidacy. Certain ethers, trademarked petroleum derivatives, and epoxy resins are also satisfactory. All plasticizers that fall within the specifications set forth are contemplated to be within the invention.

In accordance with the present invention, an improvement is provided in current methods of drawing fiber from polyolefin resin containing up to about 10 weight percent of polyvinylpyridine as dye receptor. In the current state or technology, the polyolefin resin is melt spun into fiber and the fiber is drawn to orient polyolefin crystals of the fiber. During the drawing stage the fiber is passed over a drawbar heated to a temperature of from about 65° C. to about 140° C. According to the improvement provided with the present invention, a plasticizer, for example one of those above characterized or exemplified, is blended with a polymer or a vinyl pyridine base, and the resultant plasticized polymer is mixed in minor amounts, up to about 10 percent, with a polyolefin resin such as polypropylene. A sufficient amount of plasticizer is blended with the vinyl pyridine polymer such that the polymer has a glass transition temperature no higher than the temperature to which the drawbar is heated so that the vinyl pyridine polymer substantially elongates with the polyolefin during drawing.

In determining the sufficient amount of plasticizer to blend with polyvinylpyridine, cognizance is taken of the temperature at which the drawbar or equivalent heater is operated. The current conventional temperature range for drawbar operation is from about 65° C. to about 140° C. Usually, a temperature of from 80°–90° C. is employed, and the speed at which the fiber is pulled over the drawbar is on the order of about 500 feet per minute. Because it is unlikely that the fiber increment passing across the drawbar will reach the temperature of the drawbar during that fraction of a second, it is desirable that the glass transition temperature of the vinyl pyridine polymer be from 10°–50° C. lower than the drawbar temperature to assure that the glass transition temperature of such polymer is attained or exceeded in that time, Preferably, for processing convenience, glass transition temperature will be higher than room temperature, but it need not be.

As an aspect of this invention, a dyeable fiber is disclosed comprised of a blend of a fiber-forming polyolefin with up to about 10 weight percent, based on the weight of the blend, of a vinyl pyridine polymer plasticized with an amount of plasticizer effective to lower the glass transition temperature of the polymer to a level no higher than the temperature within a range of from 65° C. to about 140° C., to which a drawbar is heated in the drawing of the fiber.

The polymers of vinyl pyridines used in the practice of this invention are known to the art, and may be prepared by the suspension and solution polymerization methods with a polymerization inhibitor such as azobisisobutyronitrile. Such polymers, as did the polymers used in the examples herein, have an intrinsic viscosity in excess of 0.05, preferably in excess of 0.1 but less than about 3.0 or so, as measured in methanol at 25° C. A preferred molecular weight range is from about 12,000 to about 15,000.

The polyolefin used herein is polypropylene. Mixtures of polypropylene and plasticized polyvinylpyridines were made by mechanically mixing them in finely divided form. The mixture was extruded in blends which were subsequently fed into a conventional melt spinning apparatus to obtain fiber. The fiber was then drawn and knitted into swatches and the swatches were dyed with dispersed dyes to levels as intense as controls which contained relatively more polyvinylpyridine dye receptor. The plasticizer was observed to have no apparent adverse effect on the spinnability performance of the resin and the dyeability of the fiber.

Further details of the practice of the present invention are set forth in the following example, which is intended to illustrate particular embodiments of the present invention. In the example, all parts and percentages are by weight unless otherwise indicated.

Example 1

The effect of three relatively nonvolatile plasticizers, dibutyl phthalate, di-n-octyl phthalate, and tri-m-cresyl phosphate, on the glass transition temperature of a 40 percent –60 percent 2-vinylpyridine, 60 percent –40 percent 2-methyl-5-vinylpyridine was determined by adding the weight percents of plasticizer indicated in Table 1 thereto.

TABLE 1.—THE EFFECT OF PLASTICIZERS ON THE GLASS TRANSITION TEMPERATURE OF POLYVINYLPYRIDINE

| Sample | Plasticizer | Wt. percent plasticizer | $T_g$ (° C.) |
|---|---|---|---|
| Polyvinylpyridine | None | | 106 |
| 1 | Dibutyl phthalate | 2.5 | 96 |
| 2 | do | 5.0 | 82 |
| 3 | do | 10.0 | 69±1 |
| 4 | Di n-octyl phthalate | 5.0 | 81.5±1 |
| 5 | do | 10.0 | 65±1 |
| 6 | Tri-m-cresylphosphate | 5.0 | 90±1 |
| 7 | do | 10.0 | 72 |

It was noted that addition of a small amount of plasticizer had a considerable effect on the glass transition temperature. Tri-m-cresylphosphate was not as effective in reducing the corresponding transition temperature of the dye receptor copolymer as were the phthalate esters.

Polypropylene blends containing 3 percent of a copolymer of 40 percent –60 percent of 2-vinylpyridine and 60 percent –40 percent of 2-methyl-5-vinylpyridine, which had been plasticized with 10 weight percent of dioctyl phthalate or tri-m-cresyl phosphate plasticizer, were spun into fibers, drawn, and knitted. The conditions and results thereof are summarized in Table 2.

TABLE 2.—SPINNING AND DRAWING OF POLYPROPYLENE FIBERS CONTAINING PLASTICIZED POLYVINYLPYRIDINE [a]

| Fiber No. | Plasticizer [b] | Spin temp., °F. | MDR | Performance | Fiber color |
|---|---|---|---|---|---|
| 1 | Dioctylphthalate | 525 | 4:1 | Good | White. |
| 2 | Tri-m-cresylphosphate | 525 | 4:1 | do | Do. |

[a] Polyvinylpyridine=a 50:50 copolymer of 2-vinylpyridine and 2-methyl-5-vinylpyridine.
[b] Concentration in polyvinylpyridine=10 weight percent.

The fibers were colored as intensely with dispersed dyes as was the control, which contained 3 weight percent of the nonplasticized copolymer. The plasticizer had no apparent effect on the spinning performance of the resin or on the dyeability of the formed fibers. Since 10 percent of the weight of the dye receptor was plasticizer, the actual concentration of copolymer in the fibers was only 2.7 weight percent, while the control fiber actually contained 3.0 weight percent of the copolymer. Thus, an equivalent, if not better, dye was obtained with less dye receptor additive than with the standard.

The spun and drawn fibers containing the plasticized copolymer were observed under a phase contrast microscope and the dye sites were seen to be very well dispersed throughout the fiber. No globules of dyesite were observed. Moreover, there were no voids in the fiber such as customarily appear in fibers made from 3 percent blends of the copolymer, indicating a substantial elongation or extension of such dyesites with the polypropylene matrix had resulted.

The absence of voids about dyesite particles is attributed to the decreased glass transition temperature of the plasticized dye receptor polymers. Reference to Table 1 reveals that the glass transition temperatures of the dye receptor polymers of Example I are substantially lower than the glass transition temperatures of the particular dye receptor employed.

Although it is to be understood that the present invention is not to be considered to be confined to any particular theory of operation, it would also appear possible that the better dispersion of dye receptor may be attributed to an ability of the plasticizers to ameliorate the tendency of the polar vinyl pyridine polymers to agglomerate into nodules in the nonpolar polypropylene, with which they are incompatible. The presence of the plasticizer with the dyesite may increase the association between the polar dyesite molecules and the nonpolar polypropylene.

Having fully described the best modes and embodiments of the present invention, it is to be understood that the present invention is not limited to the specific details set forth, but is of the full scope of the appended claims.

What is claimed is:
1. A dyeable composition which comprises a blend of
   a. a fiber-forming polyolefin and
   b. an amount up to about 10 percent, based on the weight of the blend, effective to improve dyeability of a polymer of a vinylpyridine base plasticized with an amount of a plasticizer effective to reduce the glass transition temperature of said vinylpyridine polymer to a predeter- mined temperature within the range from about 65° C. to about 140° C., said plasticizer being soluble in the polyolefin to aid the dispersion of said polymer of said vinylpyridine base in said polyolefin and, further being essentially insoluble in water, essentially nonvolatile at temperatures from about 450° F. to about 650° F., and essentially free of halogens.

2. The composition of claim 1 in which said plasticizer is selected from the group consisting of esters derived from saturated and unsaturated aliphatic and aromatic mono- and di-carboxylic acids, phosphoric acid, sulfonic acid, and polyhydric alcohols.

3. The composition of claim 1 in which said plasticizer is selected from the group consisting essentially of esters of isobutyric, caprylic, pelargonic, palmitic, stearic, abietic, oleic, benzoic, succinic, adipic, azelaic, sebacic, fumaric, maleic, tartaric, isophthalic, phthalic, mellitic, phosphoric, sulfonic acids, glycerol and glycols, or mixtures thereof.

4. The composition of claim 1 in which said plasticizer is an ester of a phthalic acid or a phosphoric acid.

5. The composition of claim 2 in which said vinylpyridine base is selected from the group consisting essentially of 2-vinylpyridine, 3-vinylpyridine, 4-vinylpyridine, 5-ethyl-2-vinylpyridine, 2-methyl-5-vinylpyridine, 2,4-dimethyl-6-vinylpyridine, 5-propyl-2-vinylpyridine, 2-vinylquinoline, 4-vinylquinoline, or a mixture thereof, and said plasticizer is selected from the group consisting of esters of isobutyric, caprylic, pelargonic, palmitic, stearic, abietic, oleic, benzoic, succinic, adipic, azelaic, sebacic, fumaric, maleic, tartaric, isophthalic, phthalic, mellitic, phosphoric, sulfonic acids, glycerol and glycols, or mixtures thereof.

6. The composition of claim 2 in which said polyolefin is polypropylene.

7. In the method of drawing fibers from a polyolefin resin containing a minor amount, up to about 10 weight percent, of a polymer of a vinylpyridine base as a dye receptor, wherein the resin is drawn across heating means heated to a temperature from about 65° C. to about 140° C. for imparting heat to the resin, the improvement which comprises employing as a dye receptor a polymer of a vinylpyridine base plasticized with an amount of a plasticizer effective to reduce the glass transition temperature of said vinylpyridine polymer to a predetermined temperature within the range from about 65° C. to about 140° C., said plasticizer being soluble in the polyolefin to aid in the dispersion of said polymer of a vinylpyridine base in said polyolefin and, further being essentially insoluble in water, essentially nonvolatile at temperatures of from about 450° F. to about 650° F. and essentially free of halogens.

8. The method of claim 7 wherein said plasticizer is selected from the group consisting of esters derived from saturated and unsaturated aliphatic and aromatic mon- and di-carboxylic acids, phosphoric acid, sulfonic acid, and polyhydric alcohols.

9. The method of claim 7 in which said plasticizer is selected from the group consisting essentially of esters of isobutyric, caprylic, pelargonic, palmitic, stearic, abietic, oleic, benzoic, succinic, adipic, azelaic, sebacic, fumaric, maleic, tartaric, isophthalic, phthalic, mellitic, phosphoric, sulfonic acids, glycerol and glycols, or mixtures thereof.

10. The method of claim 7 in which said plasticizer is an ester of a phthalic acid or a phosphoric acid.

11. The method of claim 7 in which said vinylpyridine base is selected from the group consisting essentially of 2-vinylpyridine, 33-vinylpyridine, 4-vinylpyridine, 5-ethyl-2-vinylpyridine, 2-methyl-5 -vinylpyridine, 2,4-dimethyl-6-vinylpyridine, 5-propyl-2-vinylpyridine, 2-vinylquinoline, 4-vinylquinoline, or a mixture thereof, and said plasticizer is selected from the group consisting of esters of isobutyric, caprylic, pelargonic, palmitic, stearic, abietic, oleic, benzoic, succinic, adipic, azelaic, sebacic, fumaric, maleic, tartaric, isophtalic, phthalic, mellitic, phosphoric, sulfonic acids, glycerol and glycols, or mixtures thereof.

12. The method of claim 7 in which said polyolefin is polypropylene.